(12) United States Patent
O

(10) Patent No.: US 9,755,479 B2
(45) Date of Patent: Sep. 5, 2017

(54) BLDC MOTOR FOR ELECTRICAL EQUIMENT

(71) Applicant: Hanil Patech Co., Ltd., Gyeonggi-do (KR)

(72) Inventor: Jong Hyun O, Seoul (KR)

(73) Assignee: Hanil Patech Co., Ltd. (KR)

( * ) Notice: Subject to any disclaimer, the term of this patent is extended or adjusted under 35 U.S.C. 154(b) by 279 days.

(21) Appl. No.: 14/648,083

(22) PCT Filed: Nov. 22, 2013

(86) PCT No.: PCT/KR2013/010659
§ 371 (c)(1),
(2) Date: May 28, 2015

(87) PCT Pub. No.: WO2014/084553
PCT Pub. Date: Jun. 5, 2014

(65) Prior Publication Data
US 2015/0318762 A1    Nov. 5, 2015

(30) Foreign Application Priority Data

Nov. 29, 2012  (KR) .................... 10-2012-0137262

(51) Int. Cl.
*H02K 5/16* (2006.01)
*H02K 7/14* (2006.01)
(Continued)

(52) U.S. Cl.
CPC .............. *H02K 7/14* (2013.01); *H02K 1/187* (2013.01); *H02K 1/2786* (2013.01); *H02K 5/02* (2013.01);
(Continued)

(58) Field of Classification Search
CPC .................... H02K 5/1675; H02K 5/1672
(Continued)

(56) References Cited

U.S. PATENT DOCUMENTS

2008/0131274 A1* 6/2008 Kim ................. F04D 29/668
415/204
2008/0252154 A1* 10/2008 Yamashita ............ H02K 5/04
310/51
(Continued)

FOREIGN PATENT DOCUMENTS

KR      10-0841323 B1     6/2008
KR      2009-0105239 A    10/2009
(Continued)

OTHER PUBLICATIONS

English abstract for KR-10-0841323.
English abstract for KR-10-2009-0105239.

*Primary Examiner* — Jeremy Luks
(74) *Attorney, Agent, or Firm* — Fishman Stewart PLLC

(57) ABSTRACT

A motor may include a rotating body having: a shaft pin; a rotator having a hollow hole through which the shaft pin may pass; a magnet coupled to an inner surface of the rotator; and a fan having a fan housing coupled to an outer surface of the rotator, a hollow hole formed in a center portion of the fan housing, and radial wings. The motor may also include a stator having: a stator core having a hollow hole formed in the center through which the shaft pin may pass, at least one metal core formed to rotate the rotating body with the magnet, and at least one boss protruding downward at a lower end; and a base bracket having a hollow hole through which the shaft pin may pass, at least protrusion on an outer side coupled to the at least one boss.

19 Claims, 5 Drawing Sheets

(51) Int. Cl.
    H02K 5/02      (2006.01)
    H02K 1/27      (2006.01)
    H02K 21/22     (2006.01)
    H02K 1/18      (2006.01)
    H02K 3/52      (2006.01)
(52) U.S. Cl.
    CPC ............ H02K 5/161 (2013.01); H02K 5/163 (2013.01); H02K 21/22 (2013.01); *H02K 3/522* (2013.01)
(58) Field of Classification Search
    USPC .................................................. 310/90, 91
    See application file for complete search history.

(56) References Cited

U.S. PATENT DOCUMENTS

| | | | |
|---|---|---|---|
| 2009/0047148 A1* | 2/2009 | Chen | F04D 29/056 417/354 |
| 2010/0054965 A1* | 3/2010 | Teshima | F04D 29/057 417/354 |
| 2010/0195250 A1* | 8/2010 | Sekii | F16C 17/105 360/234.1 |
| 2010/0202080 A1* | 8/2010 | Iguchi | G11B 19/2009 360/55 |
| 2012/0169173 A1 | 7/2012 | Jang et al. | |
| 2012/0212087 A1 | 8/2012 | Kwon | |

FOREIGN PATENT DOCUMENTS

| | | |
|---|---|---|
| KR | 2011-0046804 A | 5/2011 |
| KR | 10-1039635 B1 | 6/2011 |

\* cited by examiner

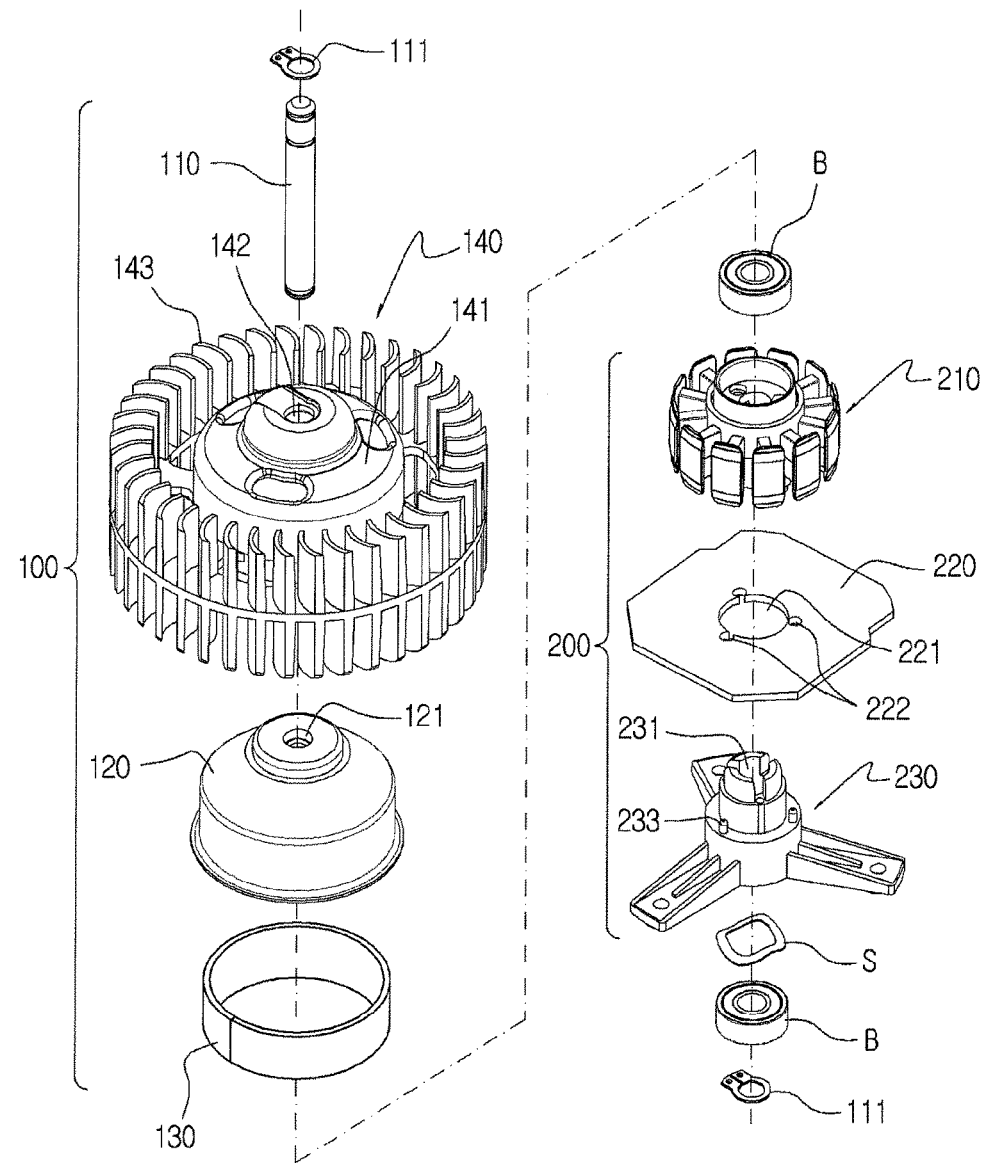
[Fig. 1]

[Fig. 2]
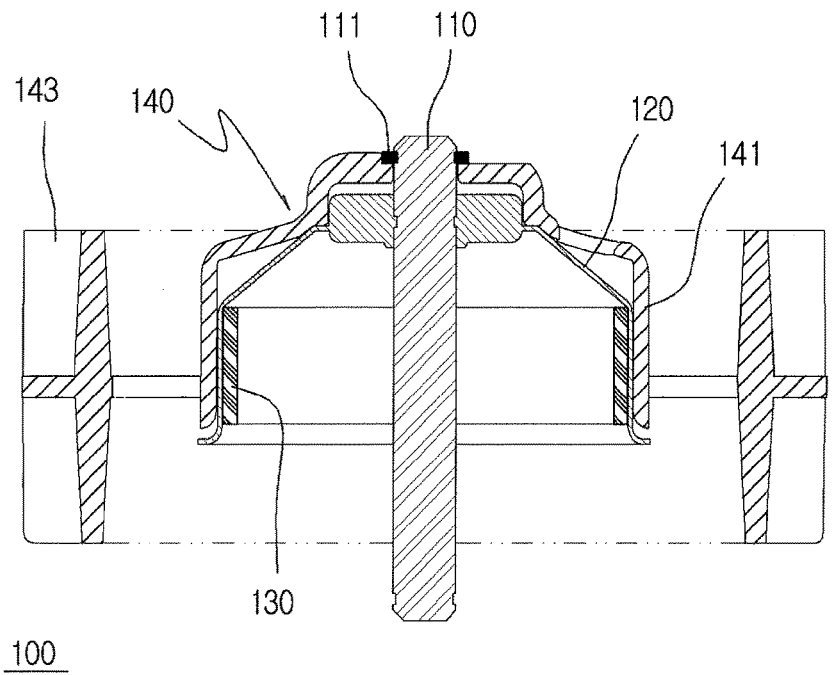
[Fig. 3]
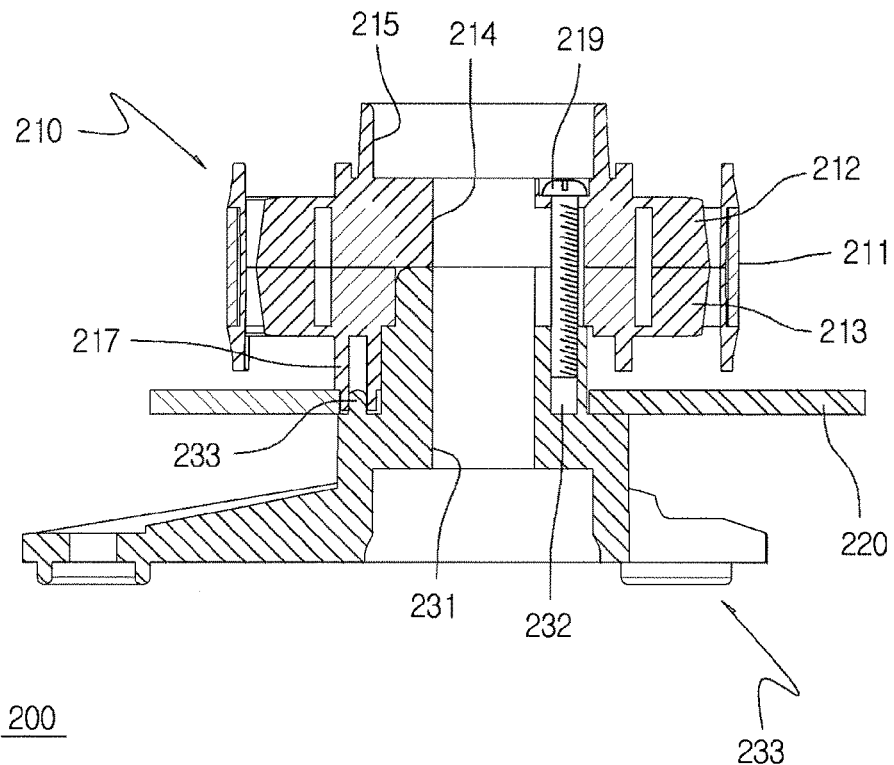

[Fig. 4]
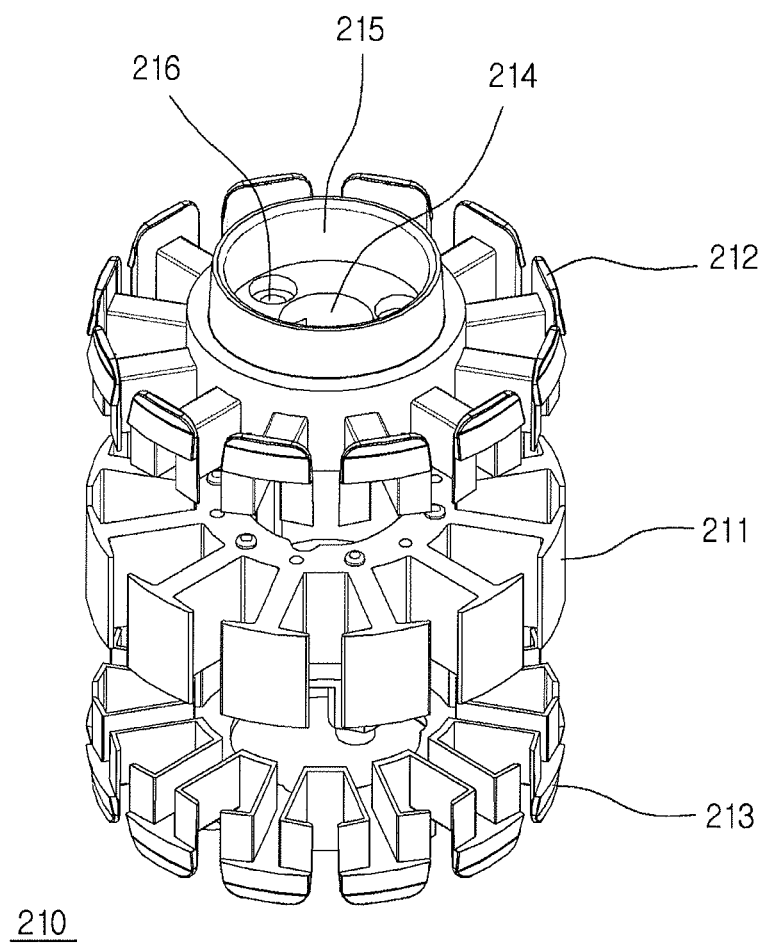

[Fig. 5]
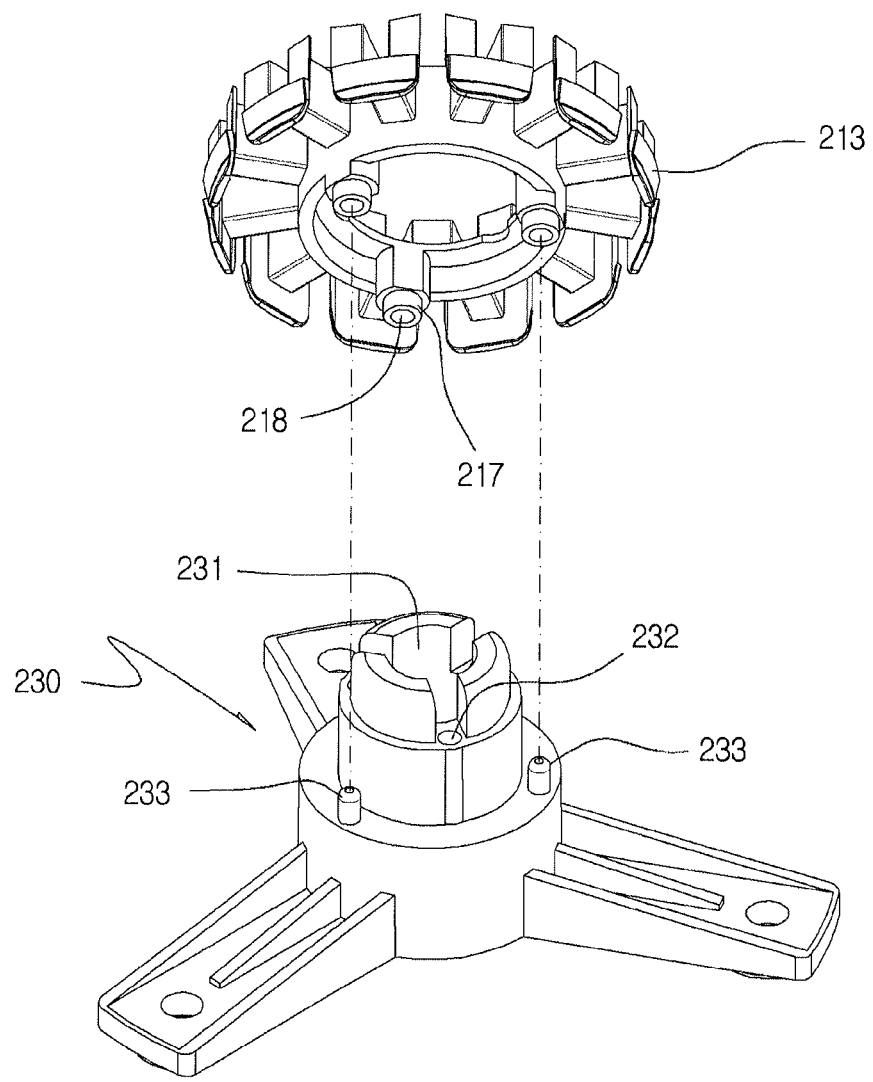

[Fig. 6]
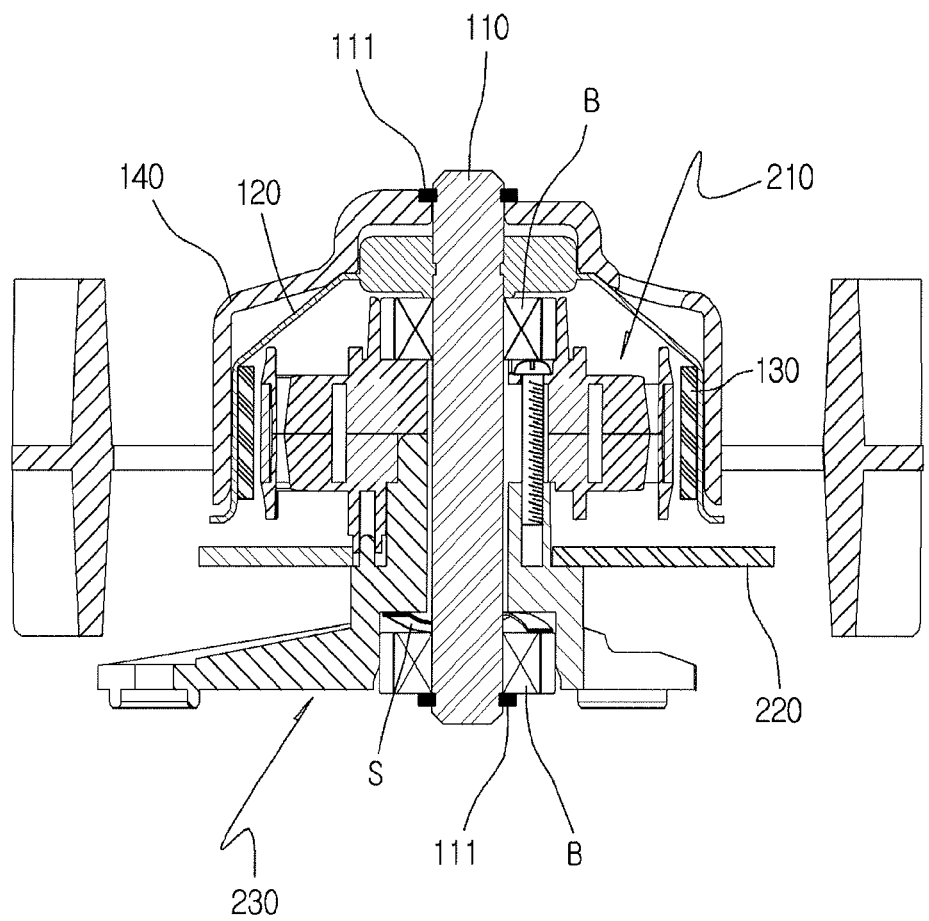

BLDC MOTOR FOR ELECTRICAL EQUIMENT

CROSS-REFERENCE TO RELATED APPLICATIONS

This application claims priority to Korean Patent Application No. 10-2012-0137262, filed Nov. 29, 2012, and International Patent Application No. PCT/KR2013/010659, filed Nov. 22, 2013, both of which are hereby incorporated by reference in their entirety.

TECHNICAL FIELD

The present invention relates to a brushless DC motor for electric devices, and in particular to a brushless DC motor for electric devices which can well be applied to an electric device, for example, a hair drier, etc. and has a simplified structure which allows saving manufacturing and assembling costs.

BACKGROUND

A brushless DC (BLDC) motor is used in various sectors in recent years since coil currents can be converted by a transistor, not a mechanical brush, and electric sparks don't occur owing to the absence of the brush, and there is not any danger which might be caused due to the explosion of gas, and the durability of such a BLDC can be longer than a common DC motor.

As an example that a BLDC motor is applied to an electric device, there may be a Korean Patent Registration No. 1039635 entitled "a BLDC motor for a hair drier" which includes a rotor housing wherein a plurality of permanent magnets are arranged at an inner side surface thereof, and a shaft hole, into which a shaft is inserted, is formed in the center thereof, and a sirocco fan is secured to an outer side thereof for generating wind; a rotor frame for interconnecting the shaft and the rotor housing and allowing them to rotate integrally; a stator core around which a coil is wound, thus generating rotational force in cooperation with the magnetic field formed on the permanent magnet; a PCB substrate which is secured by a screw to a lower side of the stator core; a base bracket at an outer side of the top of which a support shoulder is formed to support the stator core; and a bearing housing which is secured to the top of the base bracket, thus supporting the ball bearing, and has a separation prevention shoulder formed at an outer side of the bottom to prevent the separation of the stator core.

In the BLDC motor in the above patent document 1, it, however, needs to manufacture the bearing housing and the stator core in the form of separate components when configuring a fixed unit of the bearing housing, the stator core, the PCB substrate and the base bracket, for which a lot of mold manufacturing costs is necessary since each of such components should be molded. When assembling the fixed unit, the stator core and the PCB substrate are firstly assembled using screws, and then the bearing housing and the base bracket, which are separate from the stator cores, should be assembled using screws, thus entailing a complicated manufacturing process, which might result in increased labor force, longer manufacturing time, lower productivity and expensive sale price. For this reason, the patent document 1 cannot be competitive.

SUMMARY

The present inventor proposes to solve the aforementioned problems associated with the prior art and an object of the present invention is to provide a BLDC motor for electric devices wherein a fixing member, for example, a screw, etc. can be eliminated when configuring a BLDC motor for electric devices, and configuration components and assembling process may be simplified to save manufacturing and assembling costs, so productivity and price competition can be enhanced.

In order to achieve the above object, there is provided a BLDC motor for electric devices, which includes a rotation unit which is arranged rotatable and includes a shaft pin which includes a predetermined length, a snap ring being coupled to an end portion of each of both sides of the shaft pint; a rotator which has a hollow hole formed in the center of the top in order for the shaft pin to pass through and to be fixed, wherein the bottom thereof is open, and a wall is formed at a periphery of the inner space thereof; a ring type magnet which is formed in a ring type to engage to an inner surface of the wall of the rotator; and a wind blowing fan wherein a fan housing is coupled to an outer surface of the wall of the rotator, a hollow hole through which the shaft pin passes is formed in the center of the top of the fan housing, and a plurality of wings are formed in a radial shape at a periphery of the fan housing; and a fixed unit which is fixed at an electric device and includes a stator core wherein a hollow hole through which the shaft pin passes is formed in the center thereof, and a metallic core is formed on an outer circumferential surface and is exposed to the outside, and the magnet and the metallic core are arranged close at the inner side of the magnet, thus allowing the rotation unit to rotate by magnetic fields, and a mounting portion on which the bearing is mounted is integrally formed at the top, and a boss having a second hole at its lower side protrudes downward; a substrate wherein a hollow hole through which the shaft pin passes is formed in the inside, and a boss hole through which the boss passes is formed at a periphery of the hollow hole; and a base bracket wherein a hollow hole through which the shaft pin passes is formed in the center thereof, and a protrusion which is intended to be inserted into the second hole protrudes upwardly from the outer side, and a bearing is inserted into the lower side thereof.

According to the present invention, the stator core of the fixed unit is separated into an upper housing and a lower housing, and the mounting part of the upper bearing is molded together when molding the upper housing, which might lead to the elimination of a configuration component of the mounting member of a separate upper bearing. In addition, a downwardly protruding boss is formed at the lower side of the stator core, thus obtaining an assembling configuration wherein the substrate and the base bracket can be inserted. Therefore, it is possible to eliminate the bearing housing component used to install the bearing and the screws used to fix the stator core and the substrate, the base bracket, etc. which are all used in the conventional art, thus reducing the number of the components and lowering the mold manufacturing cost for molding such components while eliminating the screw assembling process. For this reason, the present invention can provide improved assembling workability while greatly enhancing productivity. As a result, it is advantageous to have good competitive expenses.

BRIEF DESCRIPTION OF THE DRAWINGS

FIG. 1 is a perspective view illustrating the entire disassembled configuration of a BLDC motor for electric devices according to an embodiment of the present invention.

FIG. 2 is a cross sectional view illustrating an assembled state of a rotation unit 100 of a BLDC motor for electric devices according to an embodiment of the present invention.

FIG. 3 is a cross sectional view illustrating an assembled state of a fixed unit 200 of a BLDC motor for electric devices according to an embodiment of the present invention.

FIG. 4 is a cross sectional view illustrating the entire assembled state of a BLDC motor for electric devices according to an embodiment of the present invention.

FIG. 5 is a perspective view illustrating an engaged relationship of a stator core 210 and a base bracket 230 of a fixed unit 200 in FIG. 3; and FIG. 6 is a disassembled perspective view illustrating a stator core 210 of a fixed unit 200 in FIG. 3.

DETAILED DESCRIPTION

In the present invention, there is provided a BLDC motor for electric devices, which includes a rotation unit which is arranged rotatable and includes a shaft pin which includes a predetermined length, a snap ring being coupled to an end portion of each of both sides of the shaft pint; a rotator which has a hollow hole formed in the center of the top in order for the shaft pin to pass through and to be fixed, wherein the bottom thereof is open, and a wall is formed at a periphery of the inner space thereof; a ring type magnet which is formed in a ring type to engage to an inner surface of the wall of the rotator; and a wind blowing fan wherein a fan housing is coupled to an outer surface of the wall of the rotator, a hollow hole through which the shaft pin passes is formed in the center of the top of the fan housing, and a plurality of wings are formed in a radial shape at a periphery of the fan housing; and a fixed unit which is fixed at an electric device and includes a stator core wherein a hollow hole through which the shaft pin passes is formed in the center thereof, and a metallic core is formed on an outer circumferential surface and is exposed to the outside, and the magnet and the metallic core are arranged close at the inner side of the magnet, thus allowing the rotation unit to rotate by magnetic field, and a mounting portion on which the bearing is mounted is integrally formed at the top, and a boss having a second hole at its lower side protrudes downward; a substrate wherein a hollow hole through which the shaft pin passes is formed in the inside, and a boss hole through which the boss passes is formed at a periphery of the hollow hole; and a base bracket wherein a hollow hole through which the shaft pin passes is formed in the center thereof, and a protrusion which is intended to be inserted into the second hole protrudes upwardly from the outer side, and a bearing is inserted into the lower side thereof.

It is obvious that the present invention can be modified into various forms and can have a variety of embodiments. Hereinafter, the preferred forms of the present invention may be illustrated, and the present invention will be described in detail. However, such a disclosure is not intended to limit the present invention only in the illustrated forms, and it should be understood that the spirit and technical scope of the present invention can include typical changes or equivalents or alternatives which are all illustrated.

FIG. 1 is a perspective view illustrating the entire disassembled configuration of a BLDC motor for electric devices according to an embodiment of the present invention, FIG. 2 is a cross sectional view illustrating an assembled state of a rotation unit 100 of a BLDC motor for electric devices according to an embodiment of the present invention, FIG. 3 is a cross sectional view illustrating an assembled state of a fixed unit 200 of a BLDC motor for electric devices according to an embodiment of the present invention, and FIG. 4 is a cross sectional view illustrating the entire assembled state of a BLDC motor for electric devices according to an embodiment of the present invention.

As illustrated in FIGS. 1 to 4, the BLDC motor for electric devices according to the present invention may be roughly classified into a rotor 100 and a fixed unit 200.

Here, the rotation unit 100 is engaged rotatable with the fixed unit 200, thus generating wind and is formed of a shaft pin 110, a rotator 120, a ring type magnet 130 and a wind blowing fan 140. The fixed unit 200, for example, is fixed in the inside of an electric device, for example, a hair drier, and is formed of a stator core 210, a substrate 220 and a base bracket 230. Additionally, the fixed unit 200 may further include a bearing "B" and a ring type spring "S".

First of all, the configuration components of the rotation unit 100 will be described.

The shaft pin 110 is made in a shape of a metallic rod with a predetermined length and includes a groove formed at an end portion of each of both sides, into each of which a snap ring 111 is fixedly inserted.

The rotator 120 has the top and the side surface both closed, and the bottom opened, and a hollow hole 121 formed in the center of the top thereof in order for the shaft pin 110 to pass through and to be fixed, and a wall vertically extends downward from a periphery of the inside space formed within the same.

The ring type magnet 130 is engaged to an inner surface of the wall of the side surface of the rotator 120 and is formed in a ring shape wherein a strap with a predetermined width and height is rolled up in a circular shape. The magnet 130 can be magnetized as the poles S and N can form crossing each other along the length, thus forming multiple poles.

The wind blowing fan 140 includes a fan housing 141 which has the top and the side surface both closed and the bottom opened for the sake of engagement to an outer surface of the rotator 120 and has a hollow hole 142 formed in the center of the top thereof in order for the shaft pin 110 to pass through, and a plurality of wings 143 which are formed at a periphery of the fan housing 141 in a radial shape, thus generating wing when they rotate. At this time, the fan housing 141 and the wings 143 may be integrally formed by molding synthetic resin in an injection molding way.

As illustrated in FIG. 2, the rotation unit 100 may be configured in the way that the snap ring 111 is inserted into the top thereof with respect to the shaft pin 110, and the fan housing 141 of the wind blowing fan 140 is coupled to the bottom thereof, and the rotator 120 is engaged in the space of the inner side of the fan housing 141, and a ring type magnet 130 is fixed to an inner surface of the wall of the rotator 120.

Next, the components of the fixed unit 200 will be explained.

The stator core 210 is formed in the way that a hollow hole 214 through which the shaft pin 110 passes is formed in the center, and a metallic core 211 is formed at an outer circumferential surface thereof and is exposed to the outside in a shape where an electrically connected metallic material is arranged like a coil, and a mounting portion 215 is formed at the top thereof to mount the bearing "B".

In addition, a plurality of bosses 217 each having a second hole 128 protrude downward from the bottom of the stator core 210 (cf. FIG. 5) and are arranged in the inner space of the rotator 120, so magnetic field can be formed between the ring type magnets 130 when electric power flows through the metallic core 211 since the metallic core 211 is arranged near the inner side of the ring type magnet 130.

The substrate 220 has printed electric circuits and electric components (not shown). A hollow hole 221 through which the shaft pin 110 passes is formed inside the substrate 220. A boss hole 222 through which a boss 217 downwardly protruding from the bottom of the stator core 210 passes is formed at a periphery of the hollow hole 221.

A hollow hole 231 through which the shaft pin 110 passes is formed in the center of the base bracket 230, and an upwardly protruding protrusion 233, which will be inserted into the second hole 218 of the boss 217 is formed at an outer side of the hollow hole 231, and a groove (reference number is not assigned) into which the bearing "B" is inserted is formed at the bottom thereof.

The above fixed unit 200, as illustrated in FIG. 3, is formed in a structure wherein the protrusion 233 of the base bracket 230 is inserted in the second hole 218 of the boss 217 in a state where the boss hole 222 of the substrate 220 is inserted in the boss 217 of the stator core 210, so the stator core 210 and the base racket 230 can be fixed each other without any fixing means, for example, a screw, etc., and the substrate 220 is interposed between such components.

Meanwhile, the engagement of the rotation unit 100 and the fixed unit 200 is secured in the way that the shaft pin 110 of the rotation unit 100 passes through the hollow holes 214, 221 and 231 of the component of the fixed unit 200 in a state where the bearing "B" is inserted in the mounting portion 215 of the top of the stator core 210, and the ring type spring "S" and the bearing "B" are sequentially inserted into the grooves (reference number is not assigned) formed at the bottom of the base bracket 230, and the snap ring 111 is fixedly coupled to the lower most portion of the shaft pin 110.

In this case, one (positioned at the upper side in the drawing) of the snap rings 111 coupled to an end portion of each of both sides of the shaft pin 110 is fixed contacting with the top of the fan housing 141, and the other one (positioned at the lower side in the drawing) is fixed contacting with the bottom of the bearing "B" inserted in the groove formed at the lower side of the base bracket 230. At this time, a ring type spring "S" is interposed between the top of the bearing "B" and the base bracket 230. Here, the spring "S" provides an elastic force (flexibility by elastically adjusting the distance in the upward and downward directions) in the upward and downward directions.

Therefore, magnetic field can be formed between the magnet 130 and the metallic core 211 when electric current flows through the metallic core 211 of the stator core 210, so only the rotation unit 100 can rotate against the fixed unit 200. At this time, the rotation unit 100 can be made to more smoothly rotate by automatically adjusting the strokes between the upper and lower bearings "B" by using the spring "S".

FIG. 5 is a perspective view illustrating an engaged relationship of a stator core 210 and a base bracket 230 of a fixed unit 200 in FIG. 3.

In another embodiment of the present invention, the stator core 210 and the base bracket 230 can be fixed together using the screw 219.

For this configuration, the first hole 216 is formed at the mounting end of the stator core 210, and the screw hole 232 is formed at a portion corresponding to the first hole 216 in the base bracket 230. As illustrated in FIG. 4, the stator 210 and the base bracket 230 can be coupled together through the screw 219, by means of which more stable engagement can be obtained.

FIG. 6 is a disassembled perspective view illustrating the stator core 210 of the fixed unit 200 in FIG. 3.

Referring to FIG. 6, the stator core 210 includes a metallic core 211 which is electrically connected to the substrate 220 and is formed in the way that a metallic coil is formed in a radial shape on an outer circumferential surface thereof, an upper housing 212 which is formed by injection-molding a synthetic resin to cover the top of the metallic core 211, and a lower housing 213 which is formed by injection-molding a synthetic resin to cover the bottom of the metallic core 211.

At this time, the mounting portion 215 is simultaneously molded when injection-molding the upper housing 212, so the use of a separate component can be eliminated when mounting the bearing "B". In addition, the boss 217 with the second hole 218 can be simultaneously molded when injection-molding the lower housing 212, so it is possible to engage the substrate 220 and the base bracket 230 in the assembling way without using screws.

As described above, the rotation operations of the rotation unit 100 by the formation of the magnetic field between the metallic core 211 and the magnet 130 can be generally performed by the BLDC motor, so the detailed descriptions on the electric operation will be omitted since such descriptions may make unclear the features of the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A BLDC (Brushless DC) motor for electric devices, comprising:
   a rotation unit which is arranged rotatable and includes:
      a shaft pin which has a predetermined length, a snap ring being coupled to an end portion of each of both sides of the shaft pin;
      a rotator which has a hollow hole formed in a center of a top of the rotator in order for the shaft pin to pass through and to be fixed, wherein a bottom of the rotator is open, and a wall is formed at a periphery of an inner space thereof;
      a ring type magnet which is formed in a ring type to engage to an inner surface of the wall of the rotator; and
      a wind blowing fan having a fan housing coupled to an outer surface of the wall of the rotator, a hollow hole through which the shaft pin passes formed in a center of a top of the fan housing, and a plurality of wings formed in a radial shape at a periphery of the fan housing; and
   a fixed unit which is fixed at an electric device and includes:
      a stator core wherein a hollow hole through which the shaft pin passes is formed in a center thereof, and at least one metallic core is formed on an outer circumferential surface and is exposed to the outside, and the magnet and the at least one metallic core are arranged close at an inner side of the magnet, thus allowing the rotation unit to rotate by magnetic field, and a mounting portion on which a first bearing is mounted is integrally formed at a top of the stator core, and at least one boss having a second hole at its lower side protrudes downward;

a substrate wherein a hollow hole through which the shaft pin passes is formed in an inside of the substrate, and at least one boss hole through which the at least one boss passes is formed at a periphery of the hollow hole; and a base bracket wherein a hollow hole through which the shaft pin passes is formed in a center thereof, and at least one protrusion which is intended to be inserted into the second hole of the at least one boss protrudes upwardly from an outer side of the base bracket, and a second bearing is inserted into a lower side thereof.

2. The motor of claim 1, wherein a first hole is formed at a mounting portion of the stator core, and a screw hole is formed at a portion corresponding to the first hole in the base bracket, so the stator core and the base bracket can be fixed by a screw.

3. The motor of claim 1, wherein one of the snap rings secured to both side end portions of the shaft pin is fixed contacting with the top of the fan housing, and the other one is fixed contacting with a bottom of the second bearing inserted in a groove at the lower side of the base bracket, and a ring type spring is interposed between a top of the second bearing and the groove of the base bracket.

4. The motor of claim 1, wherein the metallic core is electrically connected and formed as a metallic coil in a radial shape on the outer circumferential surface of the stator core, and the stator core includes:
an upper housing which is formed by injection-molding a synthetic resin to cover a top of the metallic core; and
a lower housing which is formed by injection-molding a synthetic resin to cover a bottom of the metallic core.

5. The motor of claim 2, wherein one of the snap rings secured to both side end portions of the shaft pin is fixed contacting with the top of the fan housing, and the other one is fixed contacting with a bottom of the second bearing inserted in a groove at the lower side of the base bracket, and a ring type spring is interposed between a top of the second bearing and the groove of the base bracket.

6. The motor of claim 2, wherein the at least one metallic core is electrically connected and formed as a metallic coil in a radial shape on the outer circumferential surface of the stator core, and the stator core further includes:
an upper housing formed by injection-molding a synthetic resin to cover a top of the metallic core; and
a lower housing formed by injection-molding a synthetic resin to cover a bottom of the metallic core.

7. The motor of claim 3, wherein the at least one metallic core is electrically connected and formed as a metallic coil in a radial shape on the outer circumferential surface of the stator core, and the stator core further includes:
an upper housing formed by injection-molding a synthetic resin to cover a top of the metallic core; and
a lower housing formed by injection-molding a synthetic resin to cover a bottom of the metallic core.

8. The motor of claim 5, wherein the at least one metallic core is electrically connected and formed as a metallic coil in a radial shape on the outer circumferential surface of the stator core, and the stator core further includes:
an upper housing formed by injection-molding a synthetic resin to cover a top of the metallic core; and
a lower housing formed by injection-molding a synthetic resin to cover a bottom of the metallic core.

9. A motor comprising:
a base bracket having a hollow hole formed in a center thereof;
a stator core removably fixed to the base bracket, the stator core having a hollow hole formed in a center thereof;
a magnet disposed radially outward of the stator core;
a rotator having hollow hole formed in a top thereof and a wall defining an inner space in which the magnet is disposed, the magnet engaging an inner surface of the wall;
a fan having a fan housing coupled to an outer surface of the wall of the rotator, a hollow hole formed in the center of the fan housing, and a plurality of wings formed in a radial shape at a periphery of the fan housing;
a shaft pin inserted through the hollow holes of the base bracket, the stator core, the rotator, and the fan,
wherein the stator core includes at least one boss defining a second hole and protruding downward from a lower side of the stator core, and wherein the base bracket includes at least one protrusion corresponding to the second hole of the at least one boss, the at least one protrusion protruding upwardly from an outer side of the base bracket into the second hole.

10. The motor of claim 9, further comprising a snap ring coupled to an end portion of each of both sides of the shaft pin.

11. The motor of claim 9, further comprising a first bearing mounted to a top of the stator core, and a second bearing mounted to an underside of the base bracket.

12. The motor of claim 9, further comprising a substrate defining a hollow hole through which the shaft pin passes, and at least one boss hole formed at a periphery of the hollow hole and through which the at least one boss passes.

13. The motor of claim 9, further comprising a substrate positioned between the base bracket and the stator core, the substrate defining a hollow hole through which the shaft pin passes, and at least one boss hole formed at a periphery of the hollow hole and through which the at least one boss passes.

14. The motor of claim 9, wherein a first hole is formed at a mounting portion of the stator core, and a screw hole is formed at a portion corresponding to the first hole in the base bracket, so the stator core and the base bracket can be fixed by a screw.

15. The motor of claim 10, wherein one of the snap rings secured to both side end portions of the shaft pin is fixed contacting with the top of the fan housing, and the other one is fixed contacting with a bottom of a second bearing inserted in a groove at the lower side of the base bracket.

16. The motor of claim 15, further comprising a ring type spring interposed between a top of the second bearing and the groove of the base bracket.

17. The motor of claim 9, wherein the stator core includes:
at least one metallic core electrically connected and formed as a metallic coil in a radial shape on an outer circumferential surface thereof;
an upper housing formed by injection-molding a synthetic resin to cover a top of the at least one metallic core; and
a lower housing formed by injection-molding a synthetic resin to cover a bottom of the at least one metallic core.

18. The motor of claim 10, wherein a first hole is formed at a mounting portion of the stator core, and a screw hole is formed at a portion corresponding to the first hole in the base bracket, so the stator core and the base bracket can be fixed by a screw.

19. The motor of claim 10, wherein the stator core includes:
- at least one metallic core electrically connected and formed as a metallic coil in a radial shape on an outer circumferential surface thereof;
- an upper housing formed by injection-molding a synthetic resin to cover a top of the at least one metallic core; and
- a lower housing formed by injection-molding a synthetic resin to cover a bottom of the at least one metallic core.

* * * * *